US012766759B2

(12) United States Patent
Droz et al.

(10) Patent No.: US 12,766,759 B2
(45) Date of Patent: Oct. 20, 2026

(54) METHOD FOR PRODUCING A PART FROM COMPOSITE MATERIAL BY INJECTING A FILLED SLIP INTO A FIBROUS TEXTURE

(71) Applicant: SAFRAN AIRCRAFT ENGINES, Paris (FR)

(72) Inventors: Nicolas Droz, Moissy-Cramayel (FR); Célia Iglesias Cano, Moissy-Cramayel (FR); Philippe Charles Alain Le Biez, Moissy-Cramayel (FR); Ludovic Philippe Liais, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 471 days.

(21) Appl. No.: 17/624,997

(22) PCT Filed: Jun. 30, 2020

(86) PCT No.: PCT/FR2020/051139
§ 371 (c)(1),
(2) Date: Jan. 5, 2022

(87) PCT Pub. No.: WO2021/005282
PCT Pub. Date: Jan. 14, 2021

(65) Prior Publication Data
US 2022/0281134 A1 Sep. 8, 2022

(30) Foreign Application Priority Data
Jul. 11, 2019 (FR) ...................................... 1907815
Jul. 11, 2019 (FR) ...................................... 1907816

(51) Int. Cl.
*B28B 1/26* (2006.01)
*B28B 1/24* (2006.01)
(Continued)

(52) U.S. Cl.
CPC ................ *B28B 1/261* (2013.01); *B28B 1/24* (2013.01); *C04B 35/62844* (2013.01);
(Continued)

(58) Field of Classification Search
CPC ...................................................... B28B 1/261
See application file for complete search history.

(56) References Cited

U.S. PATENT DOCUMENTS 2,669,762 A 2/1954 Blackburn et al.
2005/0058541 A1 3/2005 Le Biez et al.
(Continued)

FOREIGN PATENT DOCUMENTS

AU 2004219602 A1 * 9/2004 ......... B29C 44/5618
CN 104760118 A 7/2015
(Continued)

OTHER PUBLICATIONS

International Search Report as issued in International Patent Application No. PCT/FR2020/051139, dated Feb. 10, 2021.

*Primary Examiner* — Susan D Leong
*Assistant Examiner* — Timothy G Hemingway
(74) *Attorney, Agent, or Firm* — CUSHMAN PARTNERS LLC

(57) ABSTRACT

A manufacturing method for a composite material part includes injecting under pressure a slip containing a refractory ceramic particle powder into the moulding cavity of an injection tooling, draining the liquid from the slip that passed through the moulding cavity and retaining the particle powder inside the moulding cavity to obtain a blank including refractory particles, demoulding the blank, and heat treating the blank to form a part. The injection tooling includes a porous material mould consisting of a moulding cavity, an enclosure of rigid material in which the porous material mould is held, the enclosure further including an injection port, a discharge vent and an injection canal
(Continued)

connecting the injection port to the moulding cavity of the porous mould for the injection of the slip into the moulding cavity. The injection tooling includes a sacrificial capsule of porous material placed in moulding cavity.

9 Claims, 2 Drawing Sheets

(51) Int. Cl.
*C04B 35/628* (2006.01)
*C04B 35/64* (2006.01)
*C04B 35/80* (2006.01)

(52) U.S. Cl.
CPC ........ *C04B 35/62892* (2013.01); *C04B 35/64* (2013.01); *C04B 35/80* (2013.01); *C04B 2235/5252* (2013.01); *C04B 2235/6022* (2013.01); *C04B 2235/6027* (2013.01); *C04B 2235/616* (2013.01); *C04B 2235/6562* (2013.01); *C04B 2235/6567* (2013.01); *C04B 2235/661* (2013.01)

(56) References Cited

U.S. PATENT DOCUMENTS

| | | | | |
|---|---|---|---|---|
| 2007/0082149 | A1* | 4/2007 | Linnot | C03B 19/066 428/34.4 |
| 2009/0223632 | A1* | 9/2009 | Le Biez | C08K 7/24 523/218 |
| 2010/0244312 | A1* | 9/2010 | Mazzanti | B28B 1/266 425/116 |
| 2017/0369382 | A1* | 12/2017 | Billotte Cabre | C04B 35/62886 |

FOREIGN PATENT DOCUMENTS

| | | | | |
|---|---|---|---|---|
| DE | 3805193 | A1 * | 8/1989 | B28B 1/26 |
| EP | 2 216 150 | A2 | 8/2010 | |
| FR | 3 041 631 | A1 | 3/2017 | |
| GB | 1 433 500 | A | 4/1976 | |
| JP | H01210306 | A * | 8/1989 | B28B 1/261 |
| WO | WO-2017060601 | A1 * | 4/2017 | B28B 1/24 |
| WO | WO 2017/187050 | A1 | 11/2017 | |

* cited by examiner

[Fig. 1]
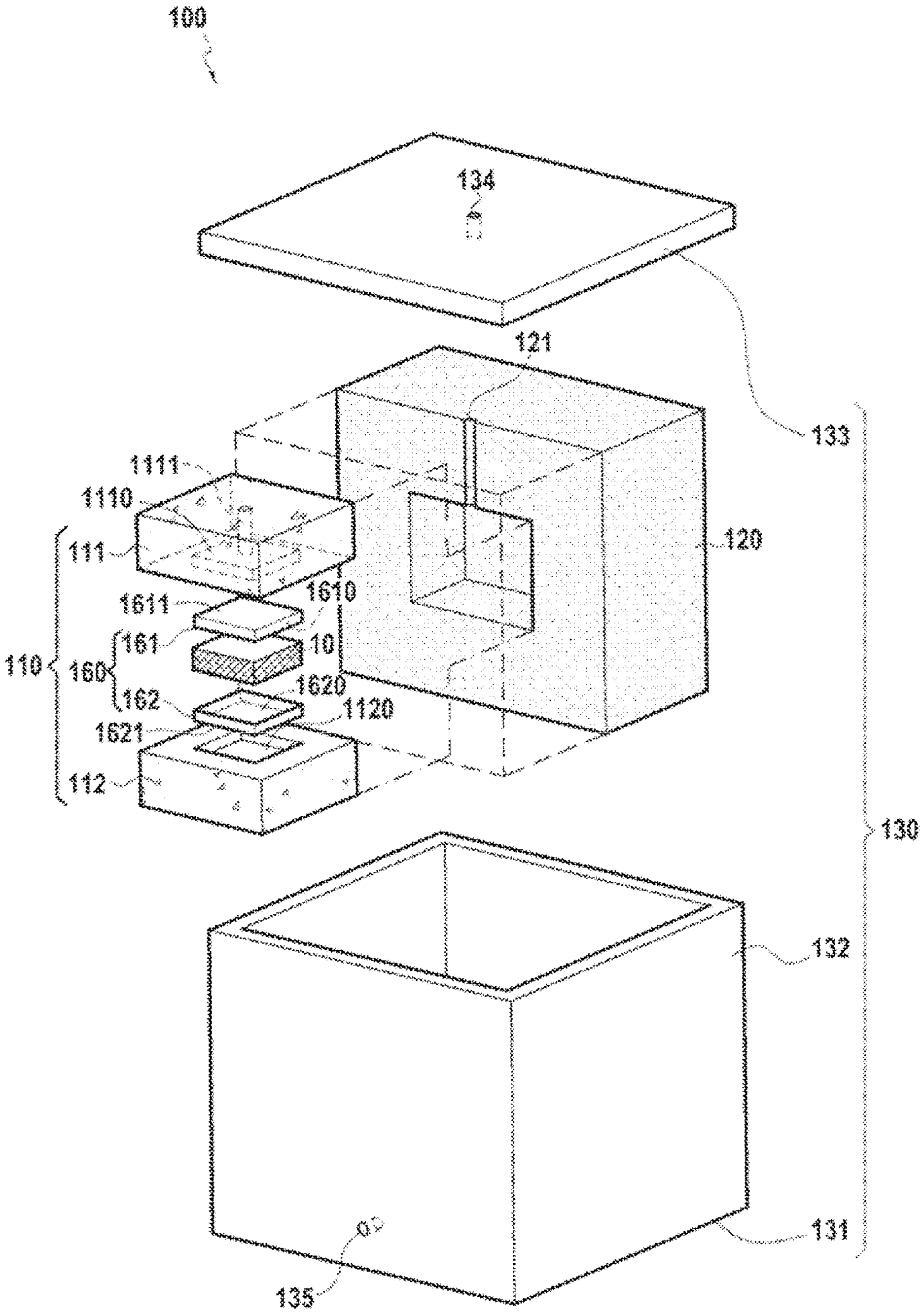

[Fig. 2]
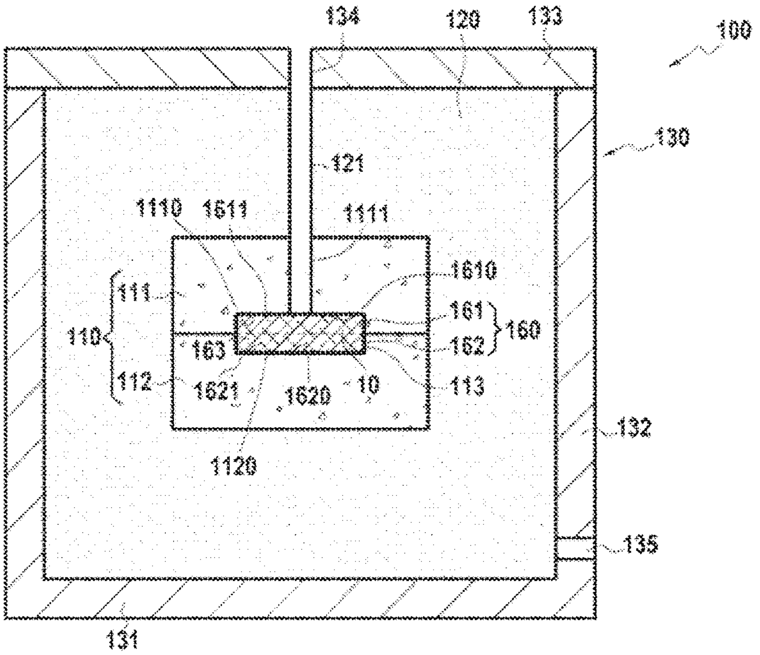
[Fig. 3]
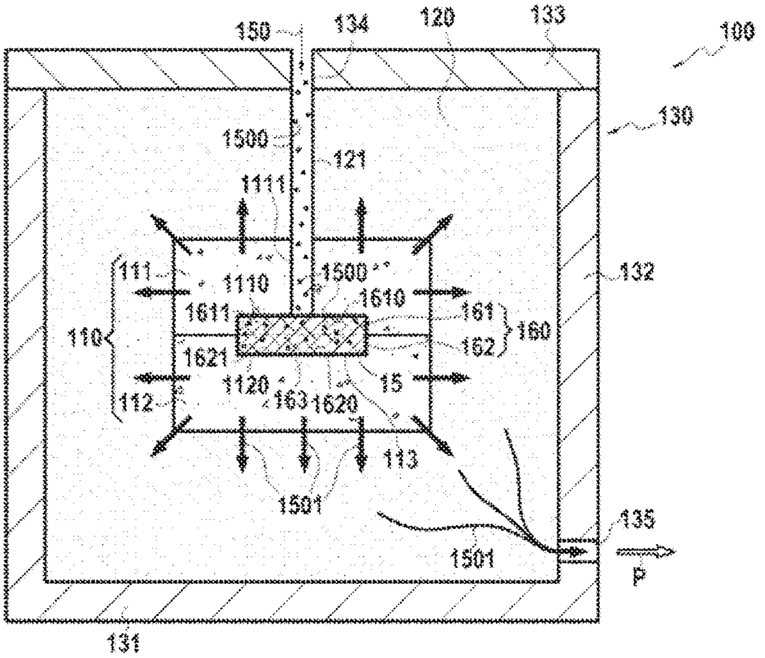

METHOD FOR PRODUCING A PART FROM COMPOSITE MATERIAL BY INJECTING A FILLED SLIP INTO A FIBROUS TEXTURE

CROSS-REFERENCE TO RELATED APPLICATIONS

This application is the U.S. National Stage of PCT/FR2020/051139, filed Jun. 30, 2020, which in turn claims priority to French patent application number 1907815 filed Jul. 11, 2019 and French patent application number 1907816 filed Jul. 11, 2019. The content of these applications are incorporated herein by reference in their entireties.

TECHNICAL FIELD

The present invention concerns the manufacture of parts from a particle-filled slip and especially ceramic parts, of abradable material or thermostructural composite material especially of the oxide/oxide type or a ceramic matrix (CMC), i.e., having a fibrous reinforcement formed of refractory ceramic fibres densified by a matrix also of refractory ceramic material.

PRIOR ART

In the case of parts of oxide/oxide composite material, or CMC, these can be created by a liquid process that comprises a step of impregnating a fibrous texture with a filled slip, for example with alumina particles in the case of an oxide/oxide composite material or silicon carbide (SiC) particles in the case of a CMC composite material. In such a case, it is necessary to drain or filter the liquid phase from the slip in order to obtain optimal filling of the residual porosities present in the fibrous texture with the solid fillers.

Document WO 2017/060601 describes the use of a porous material mould comprising a moulding cavity containing a fibrous texture into which a filled slip of solid refractory particles is injected. The porous mould makes it possible to eliminate the liquid phase from the slip introduced into the fibrous texture while retaining the solid refractory particles in the moulding cavity. The porous material is maintained inside an enclosure of rigid material during the injection of the slip under pressure. In order to route the slip to the moulding cavity, a feed canal is drilled into the porous mould as well as into any porous medium present between the mould and the rigid enclosure.

Likewise, to create single-piece parts of ceramic or abradable material, a porous material mould is used of the type described above to eliminate the liquid phase in order to retain the solid particles in the moulding cavity thereof and then obtain a blank made up of all or part of these particles.

While this solution makes it possible to optimize the drainage of the liquid phase from the slip and to deposit the particles in the moulding cavity in a homogeneous and dense manner, the demoulding of the blank after injection and filtration of the slip is a delicate operation. Indeed, the roughness of the porous material mould combined with the submicron size of the powders deposited during the injection of the slip into the moulding cavity cause the blank to catch on the mould. Since the blank is demoulded by a mechanical force (lever, scraping, etc.), there is a significant risk of deforming and/or damaging the blank and/or the mould during the demoulding operation. The application of a mechanical demoulding force on the blank can, in particular, cause local tears and/or cracks therein.

DISCLOSURE OF THE INVENTION

The present invention aims to remedy the abovementioned disadvantages and to propose a solution that makes it possible to reduce the risk of damaging the blank of the part and the porous material mould during demoulding of the blank after injection and filtration of a filled slip into the moulding cavity.

To this end, the invention proposes a manufacturing method fora part comprising the following steps:

- injecting under pressure a slip containing a particle powder into a moulding cavity by an injection tooling,
- draining the liquid from the slip that passed through the moulding cavity and retaining the particle powder inside said moulding cavity so as to obtain a blank comprising refractory particles,
- demoulding the blank, and
- heat treating the blank in order to form a part, the injection tooling comprising a porous material mould consisting of a moulding cavity, an enclosure of rigid material in which the porous material mould is held, the enclosure further comprising at least one injection port, at least one discharge vent and at least one injection canal connecting said at least one injection port to the moulding cavity of the porous mould for the injection of the slip into the moulding cavity, characterized in that the injection tooling comprises a sacrificial capsule, the sacrificial capsule being placed in the moulding cavity, said capsule being made of a porous material.

Through the use of the sacrificial capsule, no mechanical demoulding force is directly exerted on the blank, which makes it possible to avoid any damage and/or deformation of the blank and, consequently, of the final part. Thus, the blank retains its integrity and the shape adopted in the moulding cavity after demoulding. With this solution, the risk of damaging the porous material mould is also minimized.

According to a particular characteristic of the method of the invention, the method also comprises the following steps:

- forming a fibrous texture from refractory ceramic fibres,
- placing the fibrous texture in the internal volume of the sacrificial capsule before injecting the slip under pressure.

According to another particular characteristic of the method of the invention, the method also comprises the placement of glass beads in the moulding cavity before injecting the slip under pressure.

According to a particular characteristic of the method of the invention, the sacrificial capsule is made of a porous material identical to the porous material of the mould.

According to another particular characteristic of the method of the invention, the sacrificial capsule is made of one of the following materials: porous resin, polytetrafluoroethylene or plaster.

According to another particular characteristic of the method of the invention, the sacrificial capsule has a wall thickness comprised between 1 mm and 30 mm.

According to another particular characteristic of the method of the invention, the sacrificial capsule comprises a first and second part assembled together, the first part consisting of a first cavity corresponding to one portion of the shape of the part to be manufactured, the second part comprising a second cavity corresponding to the other portion of the shape of the part to be manufactured.

According to another particular characteristic of the method of the invention, the heat treatment of the blank comprises a first stage performed at a temperature between 40° C. and 95° C. so as to dry the liquid of the slip present in the sacrificial capsule and a second stage performed at a temperature comprised between 1000° C. and 1100° C. so as to bind the particles together and form a part from the blank.

According to a particular aspect, the first stage is performed according to a gentle elevation gradient comprised between 1° C./min and 6° C./min to reach a temperature comprised between 40° C. and 95° C. maintained for a duration comprised between 30 min and 90 min.

According to another particular characteristic of the method of the invention, the heat treatment also comprises a third stage performed after the first stage and before the second stage, the third stage being performed at a temperature comprised between 450° C. and 600° C. so as to burn the sacrificial capsule.

According to a particular aspect, the third stage is performed according to a gentle elevation gradient comprised between 1° C./min and 7° C./min to reach a temperature comprised between 450° C. and 600° C. maintained for a duration comprised between 30 min and 4 h.

When the method comprises the step of forming a fibrous texture, the threads of the texture can be threads formed of fibres made up of one or more of the following materials: alumina, mullite, silica, an aluminosilicate, a borosilicate, silicone carbide and carbon.

The refractory ceramic particles can be of a material chosen from: alumina, mullite, silica, an aluminosilicate, an aluminophosphate, zirconia, a carbide, a boride, a silica and a nitride or a mixture of several of these materials.

BRIEF DESCRIPTION OF THE DRAWINGS

FIG. 1 is an exploded perspective schematic view of an injection tooling conforming to one embodiment of the invention, FIG. 2 is a sectional schematic view showing the tooling of FIG. 1 closed with a fibrous texture positioned inside it, FIG. 3 is a sectional schematic view showing the impregnation of a fibrous texture with a filled slip in the tooling of FIG. 2.

DESCRIPTION OF EMBODIMENTS

The invention generally applies to the manufacture of parts created by injection of a particle-filled slip into a mould able to drain or filter the liquid phase of the slip so as to retain the particles that then constitute all or a portion of the part. In a non-limiting manner, the tooling of the invention can be used to manufacture single-piece ceramic parts, parts or coatings of abradable material and parts of thermostructural composite material, especially of the oxide/oxide type or with a ceramic matrix (CMC).

We will now describe a manufacturing method of the invention applied to the manufacture of a composite material part of the oxide/oxide or CMC type. The method for manufacturing a composite material part, especially of the oxide/oxide or CMC type, according to the present invention starts by creating a fibrous texture intended to form the reinforcement for the part.

The method for manufacturing a composite material part, especially of the oxide/oxide or CMC type, according to the present invention starts by creating a fibrous texture intended to form the reinforcement for the part.

The fibrous structure is created in a known way by weaving on at least one jacquard type loom on which a bundle of warp threads or strands has been placed in a plurality of layers, the warp threads being connected by weft threads or vice versa. The fibrous texture can also be created by stacking layers or folds obtained by two-dimensional (2D) weaving. The fibrous texture can also be created directly in a single piece by three-dimensional (3D) weaving. "Two-dimensional weaving" means here a conventional weaving method by which each weft thread passes from one side of the threads of a single layer of warp to the other or vice versa. The method of the invention is particularly suited to allow a filled slip to be introduced into 2D fibrous textures, i.e., textures obtained by stacking 2D layers or folds, of substantial thickness, i.e., 2D fibrous structures having a thickness of at least 0.5 mm, preferably at least 1 mm.

"Three-dimensional weaving" or "3D weaving" or "multilayer weaving" means here a weaving method by which at least some of the weft threads connect warp threads on several layers of warp threads or vice versa according to a weave corresponding to a weave pattern which can especially be chosen from one of the following patterns: interlock, multi-plain, multi-satin and multi-twill.

The threads used to weave the fibrous texture intended to form the fibrous reinforcement of the composite material part can especially be threads made up of one or more of the following materials: alumina, mullite, silica, an aluminosilicate, a borosilicate, silicone carbide, carbon or a mixture of several of these materials.

Once the fibrous texture is created, it is placed in an injection tooling according to the invention that allows depositing the refractory particles inside the fibrous texture, as explained below. For this purpose and as illustrated in FIGS. 1 and 2, a fibrous texture 10 is placed in an injection tooling 100. In the example described here, fibrous texture 10 is created according to one of the techniques described above (2D stacked layers or 3D weaving) with Nextel 610™ alumina threads. Fibrous texture 10 is intended here to form the fibrous reinforcement of a composite oxide/oxide blade.

The tooling 100 comprises a porous material mould 110 formed of two parts 111 and 112. The two parts 111 and 112 define a moulding cavity 113 (FIG. 2) when they are assembled against one another, the cavity in which the fibrous texture is intended to be placed. The two parts 111 and 112 serve to size the blank or preform and therefore the part to be obtained as well as to adjust the amount of fibres in the part to be obtained.

In the example described here, the part 111 of the porous material mould 110 comprises an injection canal 1111 for injection of a filled slip into the fibrous texture as explained below in detail. The injection canal 1111 is created, for example by drilling, in the porous material of the mould 110.

The injection tooling 100 also comprises an enclosure of rigid material 130 in which the porous material mould 110 is held. The enclosure 130 comprises a bottom 131, a side wall 132 of one piece with the bottom 131 and a cover 133. The enclosure 130 can be made of any type of material having a sufficient rigidity to resist the injection pressures of the slip and the pumping (vacuum draw) to drain the liquid phase from it. The enclosure may especially be made of metal or plastic.

The cover 133 has an injection port 134 through which the slip is intended to be injected in order to penetrate into the porosity of the fibrous texture 10. In the example illustrated in FIGS. 1 and 2, the slip is intended to be injected through an injection port 134 emerging into the moulding cavity 113. However, it does not exceed the scope of the invention when the slip is injected through a plurality of injection ports emerging into the moulding cavity.

The enclosure 130 has a single drainage vent 135 for the liquid medium of the slip, present here on the side wall 132 in the area of the bottom 131. Of course, it does not exceed the scope of the invention when a plurality of outlet vents is implemented at different places in the enclosure.

In the embodiment described here, the porous material mould 110 has a size less than the internal volume of the metal material enclosure 130. In this case, the volume present between the porous material mould and the rigid material enclosure is filled with a porous medium 120 in order to allow circulation and drainage of the liquid phase of the slip. The porous medium 120 can particularly be made up of sand, foam, or a granular material. For the foam, any type of foam, rigid or flexible, that has a network of porosities allowing passage of the liquid medium of the slip can be used as the porous medium. Likewise, any type of granular material having a stacking rate compatible with the passage of the liquid phase of the slip can be used as a porous medium. The porous medium 120 contains an injection canal 121 in communication with both the injection port 134 of the enclosure 130 and the canal 1111 of the porous material mould 110 in order to inject the slip into the fibrous texture 10. The injection canal 121 is created, for example by drilling, in the porous material of the medium 120. In the example described here, the injection canals 121 and 1111 form the feed circuit in the injection tooling 100 for injecting the filled slip.

The volume of the vacuum present in the porous medium is preferably greater than the quantity or volume of the liquid phase in the slip that must be injected into the fibrous texture. This makes it possible to drain all of the liquid phase from the walls of the porous mould when a vacuum draw is created at the drainage vent(s) and/or during the application of pressure in the injection port.

According to one variant of embodiment, the porous material mould has external dimensions equivalent to the internal volume of the enclosure so that the porous material mould is directly in contact with the internal walls of the enclosure. In this case, the feed circuit in the injection tooling for injecting the filled slip is made up solely by the injection canal created in the porous material mould (no porous medium).

According to the invention, a sacrificial capsule 160 is interposed between the fibrous texture 10 and the porous material mould 110. More precisely, as illustrated in FIG. 1, a sacrificial capsule 160 is here made up of two half-shells 161 and 162 between which the fibrous texture is placed before it is introduced into the porous material mould 110. The half-shells 161 and 162 each respectively have a cavity 1610 and a cavity 1620. The cavities 1610 and 1620 define an internal volume 163 (FIG. 2) when these two half-shells 161 and 162 are assembled against one another, the internal volume in which the fibrous texture 10 is held. The cavities 1610 and 1620 have a shape corresponding to the shape of the part to be fabricated from the fibrous texture. The two half-shells 161 and 162 serve to size the preform and therefore the part to be obtained as well as to adjust the amount of fibres in the part when closing the porous material mould 110.

The sacrificial capsule 160 is made of porous material It can especially be made from a porous resin. In this case, the half-shells 161 and 162 of the capsule 160 are themselves made by moulding by injecting and polymerizing a resin between a mould and a counter mould, the mould having a form corresponding to the cavities 1610 and 1620 of the half-shells 161 and 162 if said cavities are identical. Otherwise, a different mould is used for each half-shell 161 and 162 so as to form a different cavity in each of them. The characteristics of the porous network in the sacrificial capsule, especially in terms of pore size and degree of porosity, can be controlled by adjusting the polymerization cycle(s) according to the nature of the resin used. Consequently, there are as many choices of porosity networks as there are porous resins available. By way of non-limiting examples, the following porous resins can be used for the creation of sacrificial capsule:

- Gil-Resin® T with pores of a size comprised between 8 and 13 μm,
- Gil-Resin® F+ with pores of a size comprised between 4 and 7 μm,
- SamaPore with pores of a size comprised between 3 and 10 μm,
- Microplast Fine with pores of an average size of 7 μm.

The sacrificial capsule 160, or more precisely the two half-shells 161 and 162 making up the capsule, can also be made from a rigid porous material such as microporous polytetrafluoroethylene (PTFE) such as the "microporous PTFE" products sold by the company Porex®. The cavities 1610 and 1620 are each respectively created thermoforming or machining of the porous material.

The porous material mould is preferably created with the same porous material used to create the sacrificial capsule, for example one of the porous materials mentioned above.

The assembly of the sacrificial capsule 160 and the porous material mould 110 allows draining the liquid medium of the slip out of the fibrous texture 10 and evacuating it by the vent 135 as a result of the application of a pressure gradient between the vent 135 and the injection port 134. For example, the mean pore size (D50) of the capsule and the porous material mould can be comprised between 1 μm and 10 μm.

The half-shell 161 of the sacrificial capsule 160 has an external surface 1611 while the half-shell has an external surface 1622. According to a particular characteristic of the invention, the external surfaces 1611 and 1622 have a flat geometry as illustrated in FIG. 1. In this case, the internal surfaces 1110 and 1120, respectively, of the two parts 111 and 112 of the mould 110 in which the half-shells 161 and 162 are respectively housed also have a flat geometry as illustrated in FIG. 1.

According to another particular characteristic of the invention, the external surfaces 1611 and 1622 have a geometry respectively corresponding to that of the cavities 1610 and 1620 of the half-shells 161 and 162. In this case, the internal surfaces 1110 and 1120, respectively of the two parts 111 and 112 of the mould 110 in which the half-shells 161 and 162 are respectively housed, also have a geometry respectively corresponding to that of the cavities 1610 and 1620 of the two half-shells 161 and 162.

The wall thickness of the sacrificial capsule 160 is made as thin as possible in order to avoid excessive combustion of the capsule during heat treatment. The wall thickness of the sacrificial capsule is determined according to the size and geometry of the part to be manufactured. In other words, the wall thickness of the sacrificial capsule is determined to be as thin as possible while being able to take on the compaction forces when they are applied as well as the pressurization forces during filtration of the slip. The sacrificial capsule has a wall thickness preferably comprised between 1 mm and 30 mm.

The fibrous texture 10 is first placed in the sacrificial capsule 160. The capsule containing the fibrous texture is then placed in the porous material mould 110 of the injection tooling 100 as illustrated in FIGS. 1 and 2.

FIG. 3 illustrates the configuration obtained during the injection of a slip 150 and the drainage of the liquid medium or phase from it. Before injecting the slip into the tooling, a vacuum draw was created within the porous material mould in order to then fill the fibrous texture as much as possible with the slip. The vacuum draw can be created by pumping at the drainage vent 135.

In FIG. 3, the slip 150 is injected under pressure by the injection port 134 and transported to the fibrous texture 10 by the injection canals 121 and 1111 so as to penetrate into the fibrous texture 10. The refractory particles 1500 present in the slip 150 are intended to allow a refractory ceramic matrix to be formed in the porosity of the fibrous texture 10. This refractory ceramic matrix can be, in one example of embodiment, a refractory oxide matrix.

The slip can be, for example, a suspension of alumina powder in water. The alumina powder used can be an alpha alumina powder sold by the Baikowski company under the name SM8.

More generally, the slip can be a suspension containing refractory ceramic particles with a mean particle size comprised between 0.1 μm and 10 μm. The content by volume of refractory ceramic particles in the slip before injection can be comprised between 15% and 40%. The refractory ceramic particles can contain a material chosen from among: alumina, mullite, silica, aluminosilicates, aluminophosphates, carbides, borides, nitrides and mixtures of such materials. Depending on their base composition, the refractory ceramic particles can also be mixed with particles of alumina, zirconia, aluminosilicate, a rare earth oxide, rare earth silicate (which can, for example, be used in environmental or thermal barriers) or any other filler making it possible to functionalize the composite material part to be obtained, such as carbon black, graphite or silicon carbide.

The liquid medium or phase of the slip can contain, for example an aqueous phase having an acidic pH (i.e., a pH less than 7) and/or an alcohol phase comprising ethanol, for example. The slip can contain an acidifier such as nitric acid and the pH of the liquid medium can be comprised between 1.5 and 4, for example. The slip can also contain an organic binder such as polyvinyl alcohol (PVA) that is particularly soluble in water.

As illustrated in FIG. 3, after injection of the slip 150, the refractory ceramic particles 1500 are present in the porosity of the fibrous texture 10. The arrows 1501 show the movement of the liquid medium or phase of the slip drained by both the sacrificial capsule 160 and the porous material mould 110.

A pump P can also be created at the outlet vent 135 during drainage, for example by means of a primary vacuum pump. Creating such a pump improves drainage and dries the fibrous texture more quickly.

In this configuration, the sacrificial capsule 160 and the porous material mould 110 make it possible to retain in the fibrous texture 10 the refractory ceramic particles 1500 initially present in the slip and to deposit all or part of these particles by filtration into the fibrous texture 10.

By using the sacrificial capsule 160 and the porous material mould 110, the liquid medium or phase 1501 of the slip can be drained from the fibrous texture 10 in all directions, the liquid medium or phase 1501 then circulating in the porous medium 120 to the vent 135 by which it is drained from the injection tooling 100. This drainage of the liquid medium in all directions improves deposition by homogenous and dense sedimentation of the refractory ceramic particles 1500 in the fibrous texture 10 and consequently obtains a high volume ratio of matrix in the final part.

Moreover, since the sacrificial capsule 160 and the porous material mould 110 are held in an enclosure of rigid material 130, they can resist the pressures of injecting the filled slip into the texture as well as those exerted by pumping to drain the liquid medium from the slip.

Once the injection and drainage steps are conducted, a blank is obtained, here corresponding to the fibrous preform 15 filled with refractory ceramic particles, for example, refractory ceramic oxide or alumina particles.

The blank, still protected inside the sacrificial capsule, is then demoulded, the demoulding of the preform being facilitated by the presence of the capsule. In particular, via the use of the sacrificial capsule, no mechanical demoulding force is directly exerted on the preform, which makes it possible to avoid any damage and/or deformation of the preform and, consequently, of the final part. Thus, the blank retains its integrity and the shape adopted in the moulding cavity after demoulding.

The blank and the capsule are then subjected to a heat treatment comprising at least the following two stages:

a) a first stage performed according to a gentle elevation gradient comprised between 1° C./min and 6° C./min to reach a temperature comprised between 40° C. and 95° C. maintained over a duration comprised between 30 min and 90 min, this first stage making it possible to dry the water contained in the capsule in order to avoid the appearance of surface porosities due to boiling, and b) a second stage performed according to a gentle elevation gradient comprised between 1° C./min and 10° C./min to reach a temperature comprised between 1000° C. and 1100° C. maintained over a duration comprised between 4 h and 10 h, this second stage making it possible both to burn the sacrificial capsule and to sinter or bind the refractory ceramic particles and thus form a refractory ceramic matrix in the porosity of the fibrous preform.

A third stage can also be performed after the first stage and before the second stage in order to decouple the elimination of the sacrificial capsule from the sintering or binding of the refractory ceramic particles. This third stage is performed according to a gentle elevation gradient comprised between 1° C./min and 7° C./min to reach a temperature comprised between 450° C. and 600° C. maintained for a duration comprised between 30 min and 4 h, this third stage making it possible to burn the sacrificial capsule.

A composite material part is thus obtained, for example a part of oxide/oxide composite material, provided with a fibrous reinforcement formed by the fibrous preform and having a high matrix volume ratio with a homogeneous distribution of the refractory ceramic matrix throughout the fibrous reinforcement.

A part of CMC composite material other than oxide/oxide can be obtained in the same way by creating the fibrous texture with silicon carbide and/or carbon fibres and by using a slip filled with particles of carbide (for example SiC), boride (for example, $TiB_2$) or nitride (for example, $Si_3N_4$).

In the case of the manufacture of a single-piece ceramic part, the sacrificial capsule is empty before injecting the slip. Once the capsule is filled by the ceramic particles gradually deposited by sedimentation and drainage of the liquid phase of the slip, the blank and the capsule are subjected to a heat treatment as explained above in order to obtain the final part. In the case of the manufacture of an abradable part or coating, beads, for example of glass, are placed in the sacrificial capsule before injecting the filled slip. The capsule and the blank made up of the beads and the particles introduced by the slip are subjected to heat treatment as explained above to form the final abradable part or coating.

The invention claimed is:

1. A manufacturing method for an abradable part comprising:

injecting under pressure a slip containing a refractory ceramic particle powder into a moulding cavity of an injection tooling, draining liquid by filtration from the slip that passed through the moulding cavity and retaining the refractory ceramic particle powder inside said moulding cavity so as to obtain a blank comprising refractory particles, demoulding the blank comprising refractory particles, and heat treating the blank comprising refractory particles in order to form the abradable part, further comprising, prior to injecting the slip, placing glass beads in the closed internal volume of the sacrificial capsule, the injection tooling comprising a porous material mould consisting of a moulding cavity, an enclosure of rigid material in which the porous material mould is held, the enclosure of rigid material further comprising at least one injection port, at least one discharge vent and at least one injection canal connecting said at least one injection port to the moulding cavity of the porous material mould for the injecting under pressure of the slip into the moulding cavity, wherein the injection tooling comprises a rigid sacrificial capsule, the rigid sacrificial capsule being placed in the moulding cavity, said rigid sacrificial capsule being made of a porous material and comprising a first part and a second part assembled together, the first part comprising a first cavity corresponding to one portion of a shape of the abradable part to be manufactured, the second part comprising a second cavity corresponding to another portion of the shape of the abradable part to be manufactured, the first cavity and the second cavity together defining a fully closed internal volume in which the blank comprising refractory particles is located and allowing drainage of a liquid phase from the slip out of the fully closed internal volume, and demoulding the blank comprising refractory particles comprising the demoulding of the rigid sacrificial capsule containing the blank comprising refractory particles, wherein the heat treating the blank sinters the refractory particles and burns the rigid sacrificial capsule.

2. The manufacturing method according to claim 1, further comprising:

forming a fibrous texture from refractory ceramic fibres, placing the fibrous texture in the closed internal volume of the sacrificial capsule before injecting the slip under pressure.

3. The manufacturing method according to claim 1, wherein the rigid sacrificial capsule is made of a second porous material identical to the porous material of the porous material mould.

4. The manufacturing method according to claim 1, wherein the rigid sacrificial capsule is made of one of the following materials: porous resin, polytetrafluoroethylene or plaster.

5. The manufacturing method according to claim 1, wherein the rigid sacrificial capsule has a wall thickness comprised between 1 mm and 30 mm.

6. The manufacturing method according to claim 1, wherein the heat treating of the blank comprising refractory particles comprises a first stage performed at a temperature between 40° C. and 95° C. so as to dry the liquid phase of the slip present in the rigid sacrificial capsule and a second stage performed at a temperature comprised between 1000° C. and 1100° C. so as to bind the refractory particles together and form the part from the blank.

7. The manufacturing method according to claim 6, wherein the first stage is performed according to a gentle elevation gradient comprised between 1° C./min and 6° C./min to reach the temperature comprised between 40° C. and 95° C. maintained for a duration comprised between 30 min and 90 min.

8. The manufacturing method according to claim 6, wherein the heat treatment also comprises a third stage performed after the first stage and before the second stage, the third stage being performed at a temperature comprised between 450° C. and 600° C. so as to burn the sacrificial capsule.

9. The manufacturing method according to claim 8, wherein the third stage is performed according to a gentle elevation gradient comprised between 1° C./min and 7° C./min to reach the temperature comprised between 450° C. and 600° C. maintained for a duration comprised between 30 min and 4 h.

* * * * *